US009632211B2

(12) United States Patent
Löffler-Mang et al.

(10) Patent No.: US 9,632,211 B2
(45) Date of Patent: Apr. 25, 2017

(54) PRECIPITATION SENSOR, ESPECIALLY A HAIL SENSOR, AND METHOD FOR DETECTING A PRECIPITATION PARTICLE

(71) Applicant: Hochschule für Technik und Wirtschaft des Saarlandes, Saarbrücken (DE)

(72) Inventors: Martin Löffler-Mang, Karlsruhe (DE); Dominik Schön, St. Wendel (DE)

(73) Assignee: HOCHSCHULE FÜR TECHNIK UND WIRTSCHAFT DES SAARLANDES, Saarbrücken (DE)

( * ) Notice: Subject to any disclaimer, the term of this patent is extended or adjusted under 35 U.S.C. 154(b) by 178 days.

(21) Appl. No.: 14/563,602

(22) Filed: Dec. 8, 2014

(65) Prior Publication Data

US 2016/0070026 A1    Mar. 10, 2016

(30) Foreign Application Priority Data

Sep. 9, 2014 (DE) .......................... 10 2014 112 926

(51) Int. Cl.
*G01W 1/14* (2006.01)
(52) U.S. Cl.
CPC .................................... *G01W 1/14* (2013.01)
(58) Field of Classification Search
CPC .................................................... G01W 1/14
See application file for complete search history.

(56) References Cited

U.S. PATENT DOCUMENTS

| 3,141,330 | A | * | 7/1964 | Murray | G01W 1/14 356/72 |
| 3,428,890 | A | * | 2/1969 | Atkins | G01W 1/14 324/611 |
| 3,611,365 | A | * | 10/1971 | Lundquist | G01R 5/28 250/214 R |
| 4,679,160 | A | * | 7/1987 | Whitener | G01W 1/14 340/621 |
| 4,750,117 | A | * | 6/1988 | Gregory | G01W 1/14 340/621 |
| 5,203,207 | A | * | 4/1993 | Sugiyama | B60S 1/0822 340/602 |

(Continued)

FOREIGN PATENT DOCUMENTS

| CA | 2027183 | A1 | 4/1991 |
| DE | 4434432 | A1 | 3/1996 |

(Continued)

OTHER PUBLICATIONS

Machine translation of WO 2006061031 A1.*

*Primary Examiner* — David Bolduc
(74) *Attorney, Agent, or Firm* — Lucas & Mercanti, LLP; Klaus P. Stoffel

(57) ABSTRACT

A method for detecting a precipitation particle, and a precipitation sensor, especially a hail sensor, which includes an impact body, a transducer for registering vibrations caused by impact of at least one precipitation particle on the impact body, and a device for evaluating the electrical signals generated by the transducer. The evaluation device is provided for the purpose of separately evaluating the signals generated by the transducer in successive measurement time intervals after impact to determine the kinetic energy of the precipitation particle.

13 Claims, 2 Drawing Sheets

(56) References Cited

U.S. PATENT DOCUMENTS

| | | | | |
|---|---|---|---|---|
| 5,528,224 | A * | 6/1996 | Wang | G01W 1/14 250/573 |
| 6,044,699 | A * | 4/2000 | Greenblatt | G01F 23/20 73/170.17 |
| 6,295,868 | B1 * | 10/2001 | Cooper | G01G 5/04 73/170.23 |
| 7,050,949 | B2 * | 5/2006 | Kokuryo | B60S 1/0818 250/573 |
| 7,286,935 | B2 | 10/2007 | Aspola et al. | |
| 7,518,329 | B2 | 4/2009 | Glaesser | |
| 8,033,156 | B2 * | 10/2011 | Housen | G01L 5/0052 73/11.01 |
| 8,635,024 | B2 * | 1/2014 | Brillhart | G01W 1/14 702/23 |
| 2005/0174720 | A1 | 8/2005 | Luukkala et al. | |
| 2006/0097907 | A1 * | 5/2006 | Fischer | G01S 13/958 342/26 R |
| 2006/0241875 | A1 * | 10/2006 | Aspola | G01W 1/14 702/50 |
| 2012/0031181 | A1 * | 2/2012 | Salmi | G01W 1/14 73/170.17 |
| 2014/0007703 | A1 * | 1/2014 | Martin | G01W 1/14 73/862.621 |

FOREIGN PATENT DOCUMENTS

| | | | |
|---|---|---|---|
| DE | 10330128 A1 | 1/2005 | |
| DE | 10330828 A1 | 2/2005 | |
| DE | WO 2006061031 A1 * | 6/2006 | G01W 1/14 |
| EP | 0422553 A1 | 4/1991 | |
| EP | 0422551 B1 | 8/1994 | |
| EP | 1639390 B1 | 11/2009 | |
| NL | WO 2013147605 A2 * | 10/2013 | G01W 1/14 |

* cited by examiner (a)

(b)

(c)

PRECIPITATION SENSOR, ESPECIALLY A HAIL SENSOR, AND METHOD FOR DETECTING A PRECIPITATION PARTICLE

CROSS-REFERENCE TO RELATED APPLICATIONS

The present application claims priority of DE 10 2014 112 9261, filed Sep. 9, 2014, the priority of this application is hereby claimed and this application is incorporated herein by reference.

BACKGROUND OF THE INVENTION

The invention pertains to a precipitation sensor, especially a hail sensor, that includes an impact plate; a transducer for registering vibrations caused by impact of at least one precipitation particle on the impact body, and a device for performing evaluations on the basis of the electrical signals generated by the transducer.

The invention also pertains to a method for detecting a precipitation particle.

A precipitation sensor of the type indicated above is known from DE 103 30 828 A1 of the applicant. The transducer of this precipitation sensor is coupled to the impact body by a solid body, which transmits the vibrations to the transducer. The solid body forms a support structure for the impact body, this structure being connected to the edge of the impact body.

EP 0 422 551 B1 describes a precipitation sensor in which a piezoelectric transducer is attached to the impact plate by a layer of adhesive. Through an evaluation of the electrical signals transmitted by the transducer, it is possible to differentiate between incoming raindrops, hailstones, and snowflakes by means of a frequency analysis.

SUMMARY OF THE INVENTION

The invention is based on the goal of creating a precipitation sensor of the type described above which can determine the kinetic energy of the precipitation particles over a wider energy range than is possible with the known precipitation sensors.

This goal is achieved according to the invention in that the evaluation device is provided for the purpose of separately evaluating the signals produced by the transducer in successive measurement time intervals after impact.

In a first measurement time interval provided a relatively short time after impact, preferably after a minimum time of at least 2 msec, the vibrations can be measured which are caused by precipitation particles with a relatively low kinetic energy and which comprise an amplitude of such a degree that the transducer can generate signals from it which correctly characterize the vibrations.

If, however, the precipitation particles strike with such a large amount of kinetic energy that a vibration is caused with an amplitude which is so large during the first measurement time interval that it lies outside a measurement range which the transducer can correctly evaluate, the signals are evaluated in a second measurement time interval, following the first measurement time interval, in which second interval the vibrations have weakened as a result of damping and thus lie within the measurement range of the transducer. In the same way, additional measurement time intervals can be provided at later times, for which the signals can be evaluated, insofar as no evaluation can be carried out in the preceding time intervals in question because the vibrations occurring in the individual case lie outside the measurement range which the transducer can correctly evaluate. It is advisable for the measurement time intervals to be provided within 200 msec, and preferably within 150 msec, after the impact.

In one embodiment of the invention, the length of the measurement time intervals and/or of the time between the measurement time interval and the impact of the precipitation particle is determined as a function of the design, form, and structure of the impact body.

Evaluation by the transducer in the various measurement time intervals offers the advantage that the kinetic energy can be determined over a wide energy range, even if the transducer itself comprises only a relatively narrow measurement range in which the kinetic energy can be correctly determined from the generated signals.

It is advisable to provide at least two, preferably at least three, measurement time intervals, which are preferably separated from each other by a certain length of time. In a preferred embodiment of the invention, it is provided that the time between successive intervals is at least 5 msec.

In one embodiment of the invention, the evaluation device is set up to analyze the amplitudes and/or the frequency of the signals. In addition to the determination of the kinetic energy of the precipitation particle on the basis of the amplitude analysis, it is also possible by means of the frequency analysis to determine the density and/or the hardness of the precipitation particle, especially of the hailstone, because precipitation particles of relatively high density or relatively high hardness cause vibrations of a higher frequency than those produced by precipitation particles of low density or low hardness.

If, as in another embodiment of the invention, the amplitude analysis and the frequency analysis are combined, the kinetic energy can be determined with even greater precision. If frequency is also used to help determine the kinetic energy, it is possible to take into account the fact that precipitation particles, especially hailstones, of different densities or hardnesses interact in different ways with the impact body. Thus, when a precipitation particle of comparatively low density or hardness such as a highly porous hailstone strikes the impact body, the impact with the body leads to a deformation of the precipitation particle which comprises a larger plastic component than that produced when a precipitation particle with the same kinetic energy but with comparatively greater density or hardness, such as a nonporous hailstone, strikes the impact body. This has the result that, on comparison of precipitation particles of the same kinetic energy but of different hardnesses or densities, the signal generated by the impact of the precipitation particle of lower density or hardness will have a smaller amplitude or a lower frequency than that of the signal produced by the precipitation particle of greater density or hardness.

In addition, it is advisable to provide that the evaluation device counts the precipitation particles striking the impact body.

In another embodiment the invention, the evaluation device comprises a filter, which is preferably configured to suppress low frequencies in order to avoid the false signals caused by after-vibrations. In addition, it is possible to filter out the incorrect measurements which can occur when several precipitation particles strike the impact body in succession at very short intervals.

The transducer is advisably connected to one side of the impact body, namely, to the side facing away from the surface of the impact body which the precipitating particles strike. Whereas it would be conceivable to arrange the transducer directly on the impact body, it is, in an especially preferred embodiment of the invention, connected to the impact body by way of a solid body, which is permanently connected to the impact body and which transmits the vibrations to the transducer, wherein the solid body preferably acts as a damper for the transmission of the vibrations to the transducer.

The stationary body advisably holds the transducer a certain distance away from the impact body, preferably a distance of at least 5 mm away.

In the preferred embodiment of the invention, the impact body is formed by an impact plate. The transducer is preferably arranged in the center of the impact plate as would be seen in a vertical projection onto the plate. With this arrangement, the dependence of the strength of the signal on the point where the precipitation particle strikes the impact plate is as weak as possible.

The transducer itself is also advisably plate-shaped. The transducer is preferably a piezoelectric transducer, the flat plate surface of which rests against, and is preferably adhesively bonded to, a flat surface of the impact body or of the fixed body.

In one embodiment of the invention, the precipitation sensor comprises a holding apparatus, which holds the impact plate at an angle to the horizontal. Incoming precipitation particles are therefore deflected to the side, and melt water or rainwater runs continuously off. The surface of the impact plate is advisably as smooth as possible, so that ice particles can slide off it. Thus there is only a limited possibility that the signals to be evaluated can be falsified by ice or water on the impact plate.

Polycarbonate in particular has been found to be an advantageous material for the production of the impact body and the solid body.

The precipitation sensor according to the invention and the method according to the invention can be used in an especially advantageous manner to determine the damage-causing potential of the impact of one or more of the precipitation particles on a building in particular or on some other object such as a motor vehicle.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
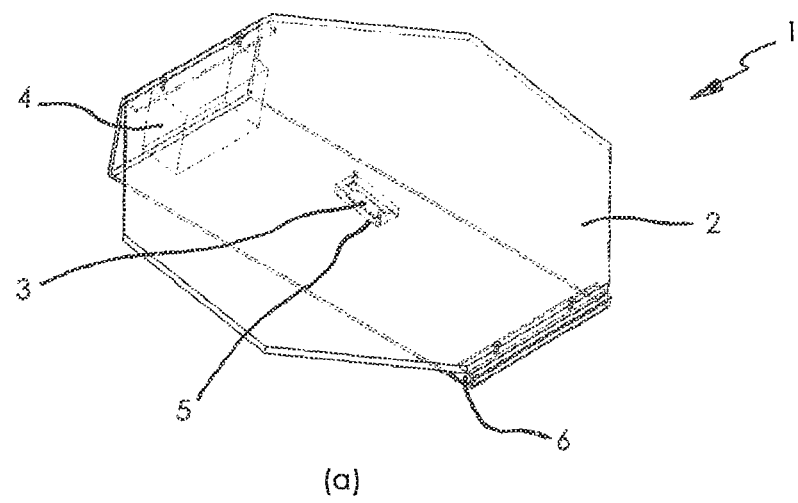
FIG. 1 shows various view of a precipitation sensor according to the invention.
Figure 1:
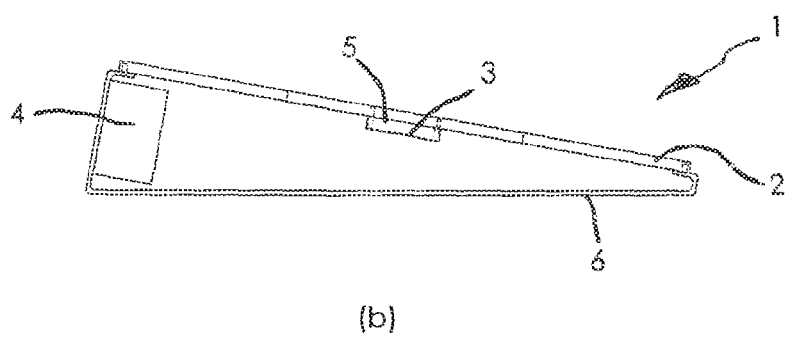
Figure 1:
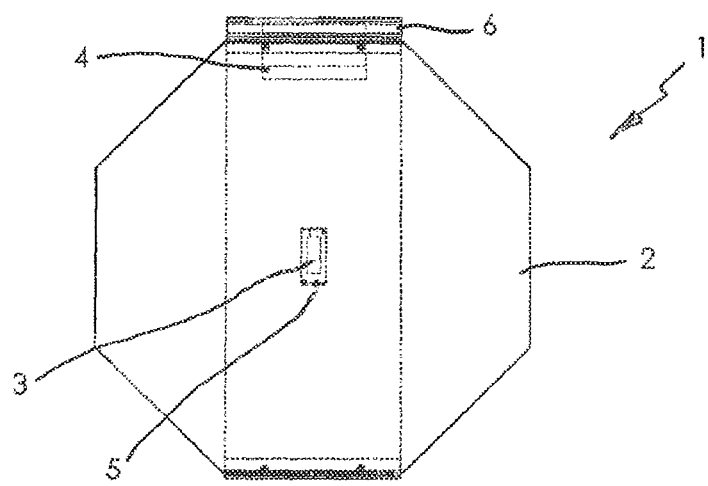

A precipitation sensor 1 shown in FIG. 1 comprises an octagonal impact plate 2 of polycarbonate, which is screwed tightly to a holder 6, which holds the impact plate 2 at an angle to horizontal. A transmission plate 5, also made of polycarbonate, is attached to the bottom of the impact plate 2, namely, to the center of the impact plate 2 as would be seen in a vertical projection onto the impact plate 2. On the side of the transmission plate 5 facing away from the impact plate 2, a plate-shaped piezoelectric transducer 3 is arranged, which is connected by connecting lines (not shown here) to an evaluation device 4, which can comprise devices for data telecommunication.

The evaluation device 4 is provided for the purpose of conducting an amplitude analysis and a frequency analysis of the signals produced by the transducer 3. The amplitude analysis is provided in such a way that the kinetic energy of the precipitating particles striking the impact plate 2 can be determined. In addition, the evaluation device 4 is provided for the purpose of determining the hardness and/or density of the incoming precipitation particles by means of the frequency analysis.

When the precipitation particles strike the impact plate 2, wave peaks or wave packets propagate from the point of impact through the material of the impact plate 2; these wave peaks continue into the transmission plate 5 and thus to the piezoelectric transducer 3.

Figure 2:
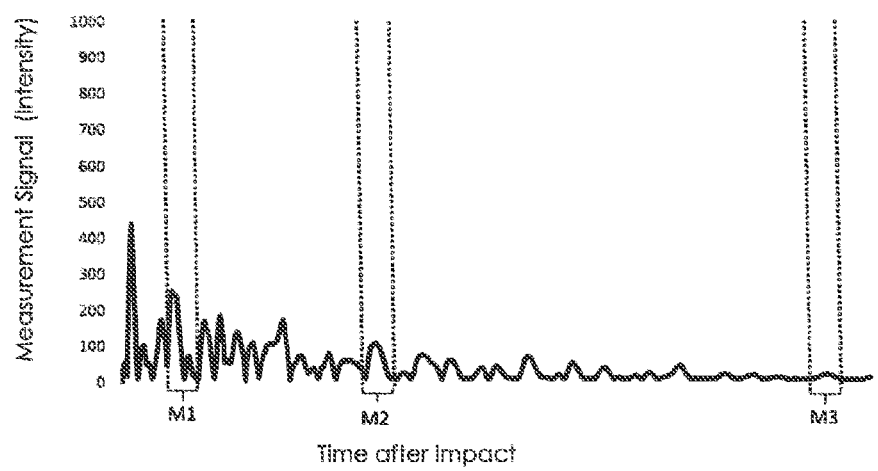
FIG. 2 shows measurement results acquired by means of the precipitation sensor according to FIG. 1.
Figure 2:
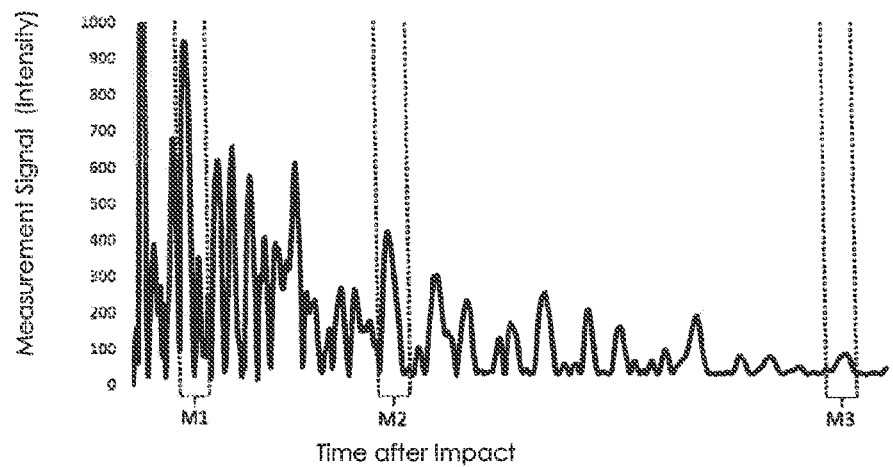
Figure 2:
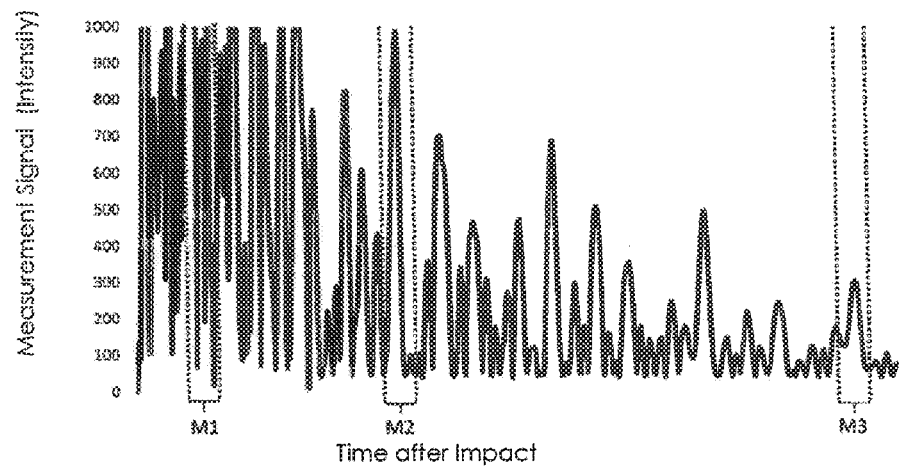

If a hailstone with a diameter of 10 mm falls onto the impact plate 2 from a height of 1 m, the piezoelectric transducer 3 generates a measurement signal, shown in FIG. 2a, caused by the vibration. The measurement signal generated in a first time interval M1 following the impact lies in a measurement range of the piezoelectric transducer 3 in which a kinetic energy of the precipitation particle can be determined correctly from the measurement signal. By means of the amplitude analysis, the kinetic energy of the hailstone is determined from the measurement signal coming from the measurement interval M1.

If, however, a hailstone with a hailstone diameter of 45 mm falls onto the impact plate 2 from the same height, the intensity of the measurement signal generated during time interval M1 is too high for the correct determination of the kinetic energy from the measurements signal. In this case, to determine the kinetic energy, a time interval M2 is used, which begins at a later time than time interval M1, namely, at a time when the vibration has already been considerably damped. The time interval M2 advisably begins at least 10 msec after the impact of the precipitation particle, wherein preferably a length of time of at least 5 msec lies between the end of the time interval M1 and the the time interval M2.

If a hailstone causes such a strong vibration upon striking the impact plate 2 that the intensity of the vibration is too high for the correct determination of the kinetic energy even in the time interval M2, as shown here on the basis of a hailstone with a diameter of 80 mm falling from the same height, the kinetic energy is determined by a frequency analysis of the signal in a time interval M3 shifted to an even later point. The time interval M3 ends preferably within 150 msec after the impact of the hailstone.

In another embodiment, the amplitude analysis and the frequency analysis for determining the kinetic energy are combined. On the basis of the data on the density or hardness of the precipitation particle derivable from the frequency analysis, the determination of the kinetic energy can take into account the fact that the impact of precipitation particles of low density or low hardness causes a signal which has a smaller amplitude and a lower frequency than the signal which precipitation particles of greater density or hardness cause. As a result, the data on the kinetic energy acquired by the amplitude analysis can be made more precise.

While specific embodiments of the invention have been shown and described in detail to illustrate the inventive principles, it will be understood that the invention may be embodied otherwise without departing from such principles.

We claim:

1. A precipitation sensor, comprising
an impact body;
a transducer for registering vibrations caused by impact of at least one precipitation particle on the impact body; and
a device for performing evaluations based on electrical signals generated. by the transducer, wherein the evaluation device is operative to evaluate separately the signals that the transducer generates in successive measurement time intervals following the impact in order to determine kinetic energy of the precipitation particle and the kinetic energy of the precipitation particle, as far as a vibration amplitude because of the impact is determined in the measurement time intervals, that lies outside a measurement range that the transducer can correctly evaluate, is evaluated using an electric signal of a respectively following measurement time interval.

2. The precipitation sensor according to claim 1, wherein the measurement time intervals are separated from each other by a defined length of time.

3. The precipitation sensor according to claim 1, wherein at least two measurement time intervals are provided.

4. The precipitation sensor according to claim 3, wherein three measurement time intervals are provided.

5. The precipitation sensor according to claim 3, wherein a first measurement time interval is for determining the kinetic energy in a first energy interval and a following successive measurement time interval is for determining the kinetic energy in a following energy interval comprising greater kinetic energies than that of the first energy interval.

6. The precipitation sensor according to claim 1, wherein the evaluation device is operatively constructed to analyze amplitudes and/or frequency of the signals.

7. The precipitation sensor according to claim 1, wherein the evaluation device is constructed to determine a hardness and/or density of the precipitation particle.

8. The precipitation sensor according to claim 1, wherein the impact body is an impact plate, and the transducer is arranged in or near a center of the impact plate as seen in a vertical projection onto the impact plate.

9. The precipitation sensor according to claim 8, wherein the transducer is arranged. a defined distance away from the impact plate and is coupled to the impact plate by a solid body that is permanently connected to the impact plate and transmits vibrations to the transducer, wherein the solid body holds the transducer the defined distance away from the impact plate.

10. A method for determining damage causing potential of an impact of a precipitation particle, comprising the steps of:
providing a precipitation sensor according to claim 1; and
determining the damage causing potential from the kinetic energy determined by the evaluation device.

11. A method for detecting a precipitation particle, comprising the steps of: registering vibrations caused by impact of the precipitation particle onto an impact body using a transducer of a precipitation sensor; and evaluating electrical signals generated by the transducer, wherein the signals which the transducer generates in successive measurement time intervals after impact are evaluated separately to determine kinetic energy of the precipitation particle and the kinetic energy of the precipitation particle, as far as a vibration amplitude because of the impact is determined in the measurement time intervals, that lies outside a measurement range that the transducer can correctly evaluate, is evaluated using an electric signal of a respectively following measurement time interval.

12. The method according to claim 10, including separating the measurement time intervals from each other by a defined length. of time.

13. The method according to claim 10, further including determining damage-causing potential of the impact of the precipitation particles based on the signals.

* * * * *